Aug. 13, 1968  S. W. ALDERFER  3,396,773
CENTRIFUGALLY CAST WHEEL
Filed Oct. 23, 1965  5 Sheets-Sheet 1

INVENTOR.
STERLING W. ALDERFER
BY Hamilton & Cook
ATTORNEYS

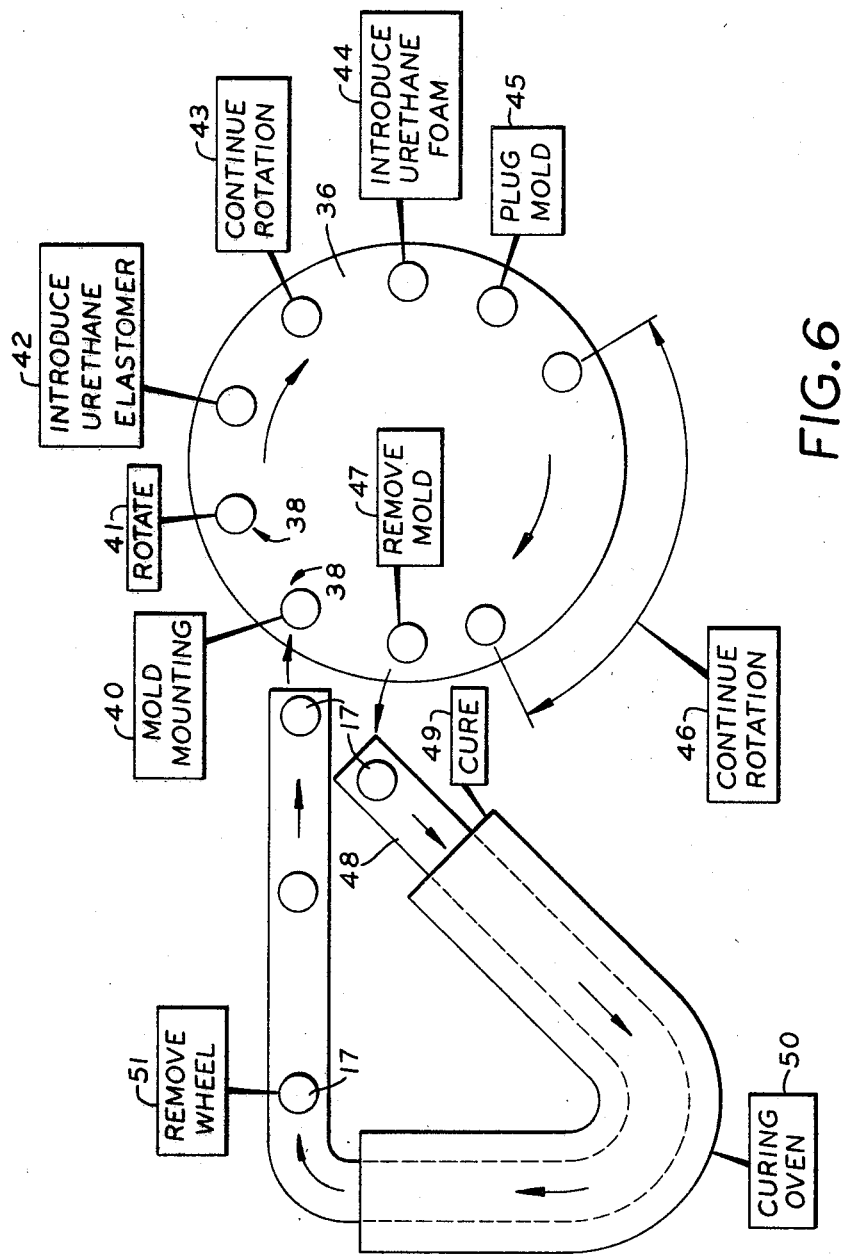

# United States Patent Office 3,396,773
Patented Aug. 13, 1968

3,396,773
CENTRIFUGALLY CAST WHEEL
Sterling W. Alderfer, Akron, Ohio, assignor to Sterling Alderfer Company, Akron, Ohio, a corporation of Ohio
Filed Oct. 23, 1965, Ser. No. 503,803
1 Claim. (Cl. 152—313)

ABSTRACT OF THE DISCLOSURE

The present invention discloses an industrial wheel having a foam formed body portion with an elastomeric peripheral tread portion. The body portion and the tread portion are integrally joined by an amalgamation of the materials forming the body and tread portions through an annular bonding zone which lies between the body and tread portions. Such a wheel can be discoid in shape with the side walls of the body portion smoothly conjoined with the tread portion. The density of the foam forming the axial portion of the body has a greater density than the remainder of the body portion to provide a bearing. The critical amalgamation of the tread and body portions is achieved by rotating the mold in which the wheel is to be formed while sequentialy introducing the tread and body forming materials. By introducing the body foaming material before the tread forming elastomer has solidified, the coalescence of the two materials into an amalgamation in the bonding zone is assured.

---

The present invention relates generally to industrial wheels. More particularly, the present invention relates to a composite, solid industrial wheel. Specifically, the present invention relates to an industrial wheel having a wear resistant elastomer tread portion bonded by amalgamation to a radially inner body portion.

Wheels used on industrial vehicles such as carts, dollies, fork lifts, and the like, have historically been comprised of an annular metallic body portion with a central bearing for rotational mounting and may, or may not, have been provided with a flexible tread portion for engagement with the surface over which the vehicle was moved.

Most industrial wheels require the utilization of a flexible tread portion to protect the surface over which the vehicle moves, some to prevent sparking and many to provide a modicum of resilience both for softening the ride characteristics of the vehicle and to minimize the shock, or impact, forces as may be applied vertically by loading or horizontally by moving against obstructions.

Such constructions, because of the metallic body portions, are quite heavy, and, because of the necessity of retaining the flexible tread portion on the metallic body portion during use, are expensive to manufacture and maintain—particularly when retreading is occasioned.

Some attempts have been made to reduce the weight of prior known body constructions by relieving the body portion between the central bearing and the outer circumference. When this is done on the exterior surfaces of the wheel, niches are provided which easily gather dirt and this is unacceptable for some uses. Conversely, if the interior of the body portion is relieved, the costs and difficulty of fabrication are greatly increased.

At least one attempt has been made to obviate the above difficulties by the use of an impregnated fibrous material. Such constructions, however, can support only minimal loading and are greatly subject to liquid absorption and its attendant difficulties.

It is therefore a primary object of the present invention to provide an industrial wheel in which the tread portion is permanently affixed to the body portion.

It is also an object of the present invention to provide an industrial wheel, as above, wherein the body portion is sufficiently inexpensive as to be readily expendable when the tread section is worn out.

It is another object of the present invention to provide an industrial wheel, as above, wherein the ride characteristics and the ability to withstand impact loading afforded thereby are variable by preselection of the desired resiliency of both the body portion and the tread portion, even to the extent that such industrial wheels may economically replace the expensive pneumatic tires so often used on wheelbarrows, mowing machines and other garden implements.

It is still another object of the present invention to provide an industrial wheel, as above, which is light in weight and may be formed with a smooth exterior to prevent the collection of dirt without increasing the cost.

It is yet another object of the present invention to provide an industrial wheel, as above, in which the bearing portion may be formed directly therein or applied later, is desired.

It is a further object of the present invention to provide an industrial wheel, as above, which has a urethane elastomer tread section amalgamated to a rigid urethane foam body portion.

It is an even further object of the present invention to provide a method for making an industrial wheel, as above.

It is a still further object of the present invention to provide an apparatus for making an industrial wheel, as above.

These and other objects of the present invention, as well as the advantages thereof over existing and prior art forms, will be apparent in view of the following detailed description of the attached drawings and are accomplished by means hereinafter described and claimed.

One preferred embodiment of the wheel and apparatus suitable for making the same, together with the description of the preferred method for making such a wheel are shown by way of example in the accompanying drawings and are described in detail without attempting to show all of the various forms and modifications in which the invention might be embodied; the invention being measured by the appended claims and not by the details of the specification.

In the drawings:

FIG. 6 is a schematic flow chart of the process for manufacturing a wheel according to the concept of the present invention.

Figure 1:
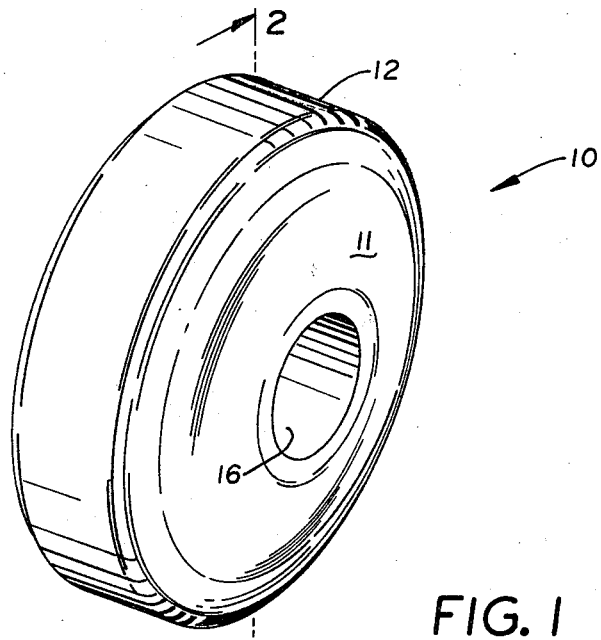
FIG. 1 is a perspective view of an industrial wheel embodying the concept of the present invention.
Figure 2:
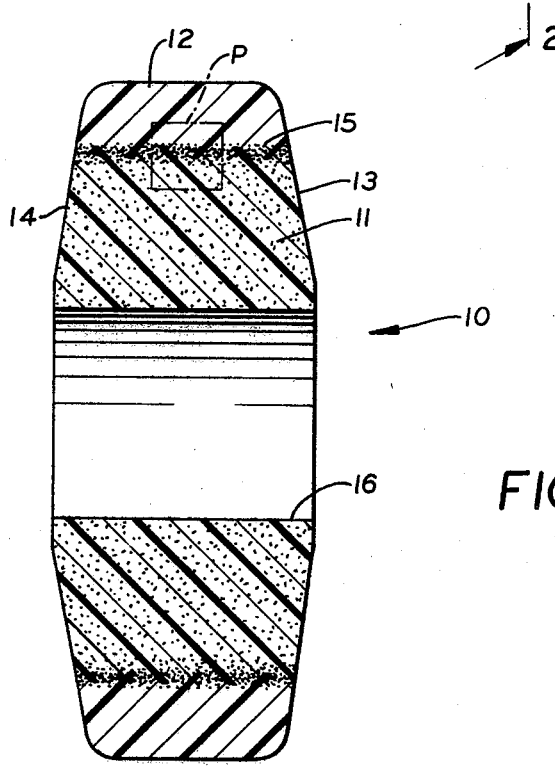
FIG. 2 is an enlarged cross section taken substantially on line 2—2 of FIG. 1.

In general, an industrial wheel embodying the concept of the present invention is composite in nature having a foam formed body portion with an elastomer peripheral tread portion. The two portions are joined together by an amalgamated bond, and the center of the body portion is adapted for a bearing mounting.

The preferred method of forming such a tire which assures the critical amalgamation between the tread and body portions of the wheel utilizes a mold having a cavity in the shape of the desired wheel. This mold is spun, or rotated, about the axis of the cavity while a predetermined quantity of the tread forming elastomer is introduced into the cavity. The rotation of the mold centrifugally positions the elastomer peripherally of the cavity in the desired tread position. With the tread forming material retained in its proper position by continued rotation of the mold, and before the tread forming elastomer has solidified, the body forming foaming material is introduced. As the foaming action of the body forming material runs to completion the remainder of the cavity is filled and the wheel is formed. The introduction of the body forming material prior the solidification, or set, of the tread forming material assures the necessary coalescence of the two materials along the juncture of the tread and body portions to provide the amalgamated bond therebetween.

One apparatus suitable for the manufacture of such an industrial wheel utilizes a mold having a cavity in the shape of the desired wheel. The mold is mounted for rotation about that axis of the cavity corresponding to the axis of the wheel to be formed therein. An access is provided into the cavity for introduction of the tread body forming material and a turning means is provided to rotate the mold at the desired speed.

Referring more particularly to the drawings, the improved industrial wheel is indicated generally by the numeral 10. Wheel 10 has a body portion 11 and a tread portion 12 which may be conjoined in the form of a discoid having axially spaced generally radially oriented side walls 13 and 14, as shown, to eliminate dirt collecting recesses. The juncture of the body portion 11 and the tread portion 12 is not sharply defined as a circumferential boundary around the periphery of the body portion 11 but is rather an annular zone 15 wherein the materials of the body and tread portions are coalesced to form an amalgamated bonding.

In the preferred form of the wheel, the tread portion 12 of the wheel 10 is formed from a urethane elastomer. Urethane elastomers are produced through the reaction of certain polyisocyanates and polyhydroxy compounds to form a long chain, essentially linear macromolecule, which is then chain extended and cross linked to complete the reaction. Conventional urethane elastomers are prepared by mixing polyesters, polyisocyanates and chain extenders together in the liquid state at elevated temperatures and introducing the mixture into molds where they are solidified. Solidification is, however, only a green cure, or set, and subsequent application of heat is required to complete the cure.

Such elastomers can be easily produced within a hardness range from 60 Shore A up to 75 Shore D while providing excellent tensile and tear strengths. Urethane elastomers are very tough and provide exceptional resistance to abrasion, ozone and oxidation so that as such it makes a very satisfactory tread portion for an industrial tire.

However, urethane elastomers are also noted for their high elongation and as a result are most difficult, if not impossible, to retain in operative tread position on prior known wheel constructions.

According to the present concept the urethane elastomer forming the tread portion 12 is amalgamated, at 15, to the body portion 11 so that retention of the tread 12 on the wheel 10 is assured.

When, therefore, as in the preferred embodiment the body portion 11 is to be formed from a rigid urethane foam, amalgamation is accomplished by proper sequential introduction of the materials into the wheel forming mold.

Rigid urethane foams may be readily produced by either of two methods—the quasi-prepolymer or the "one-shot" method.

In the quasi-prepolymer method the diisocyanate is reacted with a portion of the polyester to give a NCO-terminated prepolymer. In the foaming step the prepolymer is reacted with the rest of the polyester, catalyst, surfactant, and fluorocarbon.

The "one-shot" process is more economical in that no prereaction step is required. This process requires, simply, that at least two conduits lead to the mixing head since all the components can be premixed except for the diisocyanate, which must be modified to provide increased functionality. Apparatus particularly adapted for the charging of molds according to the "one-shot" process can be found in my copending U.S. patent application, Ser. No. 238,965, filed Nov. 20, 1962, now U.S. Patent No. 3,264,067.

The rotational axis of the body portion 11 may incorporate a standard metallic bearing race or it may itself form a bearing 16, as shown, and as more fully hereinafter described.

Figure 3:
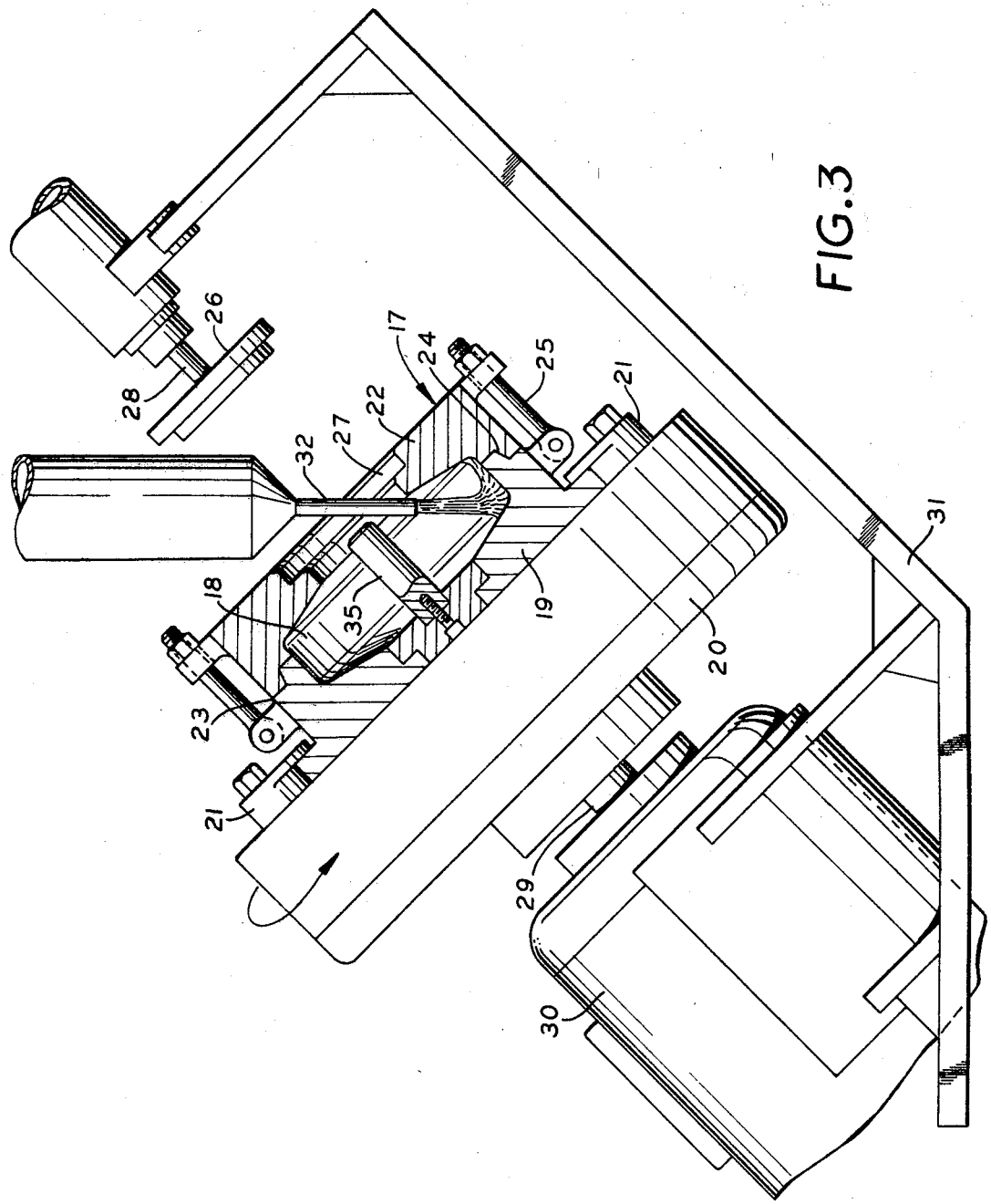
FIG. 3 is a generally schematic side elevation, partly in section, of an apparatus adapted to manufacture a wheel, as above, depicting the introduction and positioning of the tread forming material.

Wheel 10 may be formed in a mold 17 the cavity 18 of which is in the desired shape of the wheel to be formed therein. As shown in FIG. 3, the cavity 18 is generally in the shape of a discoid in order to produce a wheel having a smooth outer surface without any recesses in which to gather dirt.

The mold 17 has a base portion 19 attached to a chuck 20, as by clamping brackets 21. In order to provide for removal of the wheels formed in cavity 18 a cap portion 22 is interfitted to the base portion 19 along a parting line 23 coincident with the maximum circumference of the cavity 18. As shown, ready orientation of the cap portion 22 to the base portion 19 is obtained by incorporating a stepped shoulder 24 into the parting line 23. For many installations the step shoulder 24 may also serve to retain the cap portion 22 onto the base portion 19, but it may also be desirable to secure their proper juxtaposition by a locking arrangement such as the clamps 25.

An access plug 26 is removably positionable in the cap portion 22 of the mold in proximity to the axis of the cavity 18 for ease of charging the mold, as is also more fully hereinafter explained. This plug 26 may be locked into the access opening 27 in the cap portion 22 by any number of means which will be readily apparent to those skilled in the art, or the plug 26 may be rotationally mounted to the end of the cylinder rod 28 by which it is moved into and out of mating engagement with access opening 27.

To assure the desired amalgamation between the body and tread portions 11 and 12, respectively, it is necessary to rotate the mold 17 during at least a portion of the wheel forming process. For this purpose the mold holding chuck 20 is secured to the shaft 29 of a motor 30 for rotation therewith. The motor is in turn supported on a frame 31 in such a way as to provide an angular inclination to the mold 17. The inclination of approximately 45° (FIG. 3) for the axis of the discoid shaped cavity 18 depicted provides for easy admission of the wheel forming materials, but represents about the maximum acceptable angle of inclination. When the axis of cavity 18 is parallel to the ground—i.e., horizontal—a wide range of rotational speeds may be utilized. However, as the angle is increased to 45°, the rotational speed becomes critical so that the resolution of gravitational and centrifugal forces will properly position and maintain the tread forming material perpipherally of the cavity 18. In any event, rotation serves also to amalgamate the body forming material to the tread forming material.

Figure 4:
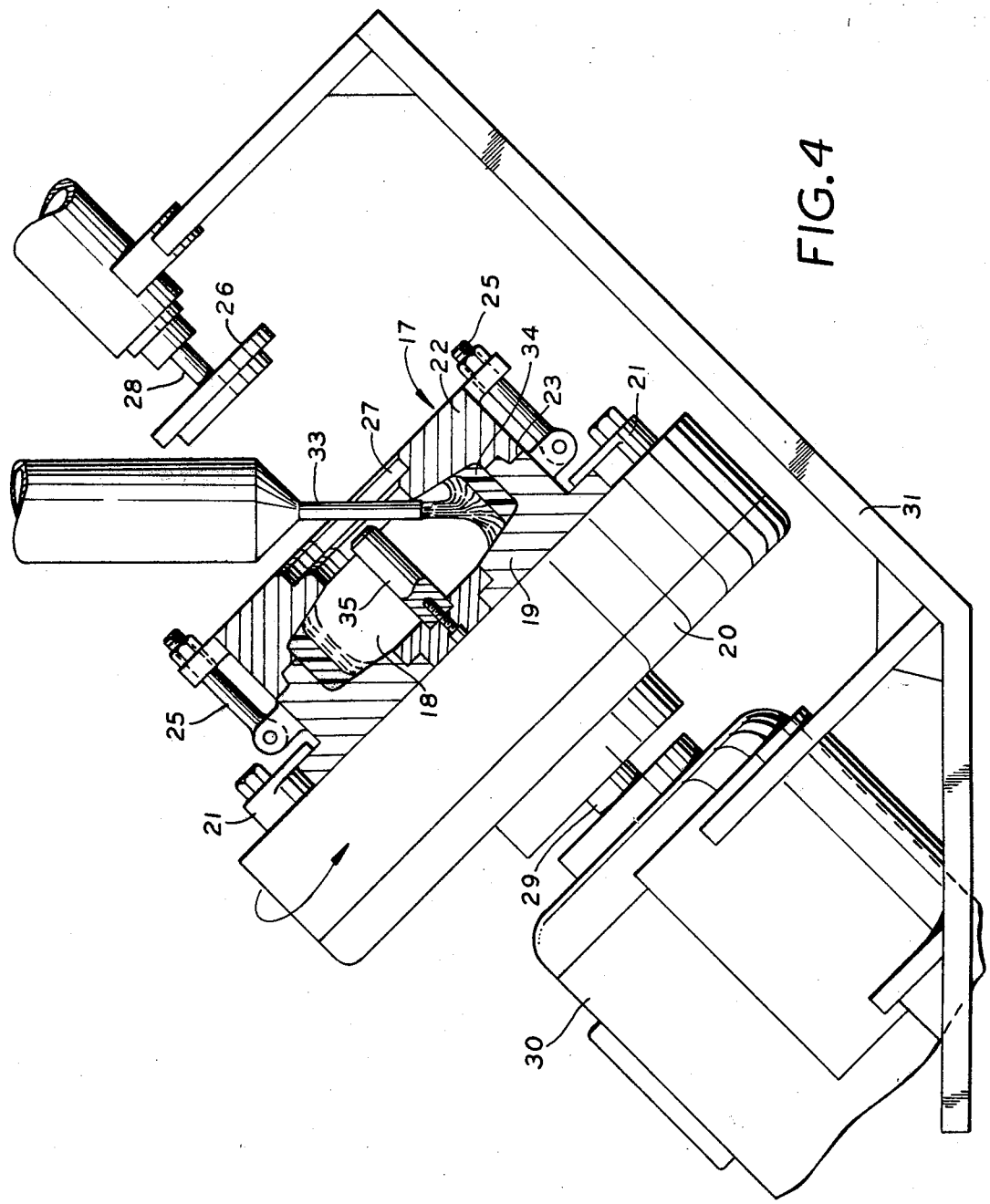
FIG. 4 is a view similar to FIG. 3 depicting the tread forming material maintained in its peripheral position while the body forming material is introduced to provide for amalagamation of the body portion to the tread portion.
Figure 5:
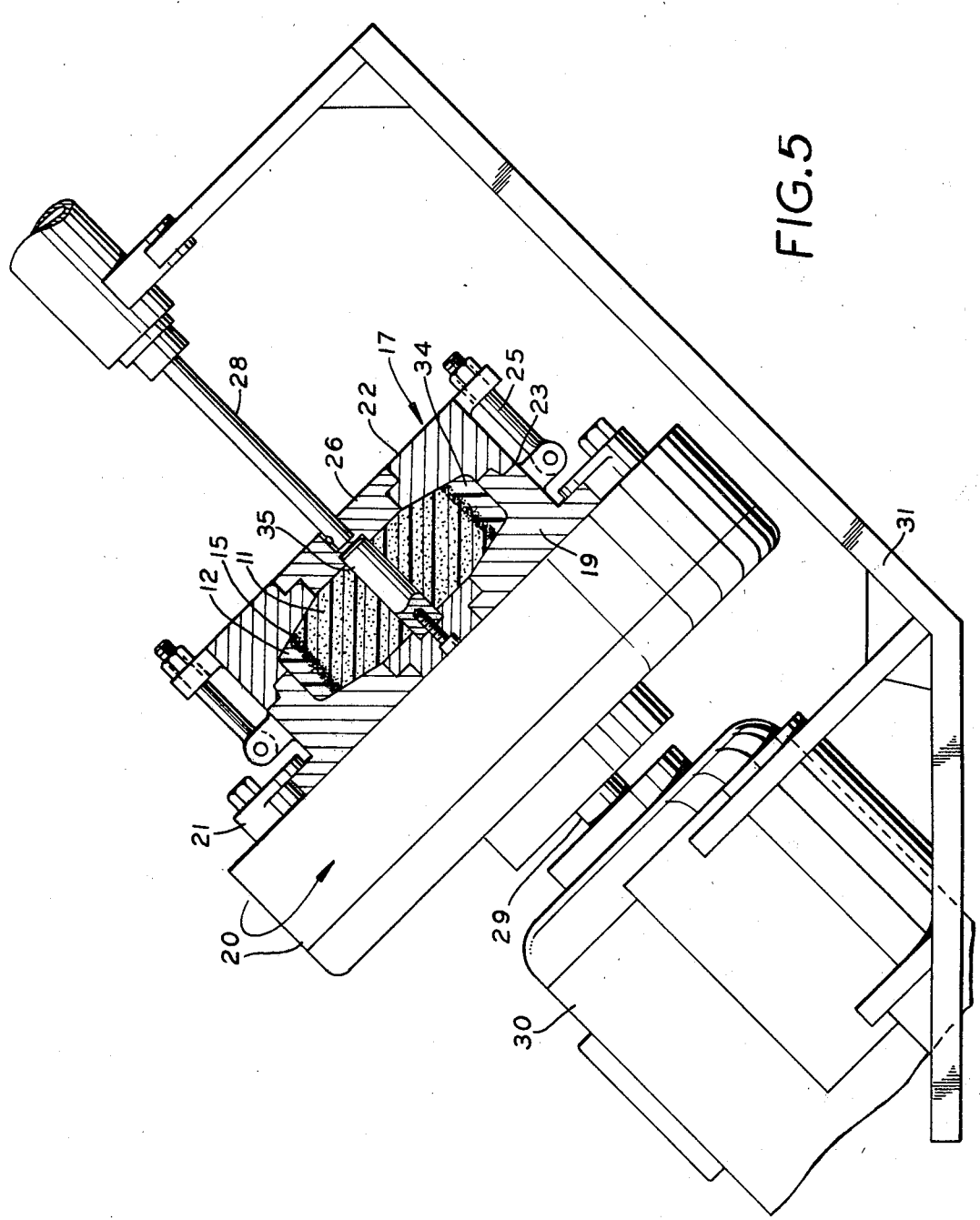
FIG. 5 is a view similar to FIGS. 3 and 4 depicting the final formation of the wheel.

To make a wheel according to the present concept the mold 17 is rotated and a predetermined charge of the tread forming material is introduced through the access opening 27 by a charging nozzle 32. The centrifugal forces developed by rotation of the mold uniformly deposits the tread forming material around the periphery of the cavity and continued rotation maintains it thus disposed while the body forming material is introduced. As shown in FIG. 4, the body forming material is introduced by a mixing head 33 through access opening 27 while continued rotation of the mold 17 maintains the annulus 34 of the tread forming material peripherally disposed. After a predetermined quantity of the mold forming material is introduced, the plug 26 is inserted into the access opening 27.

When using the preferred tread forming elastomer, the body forming urethane foam must be introduced prior solidification of the urethane elastomer in order to assure the amalgamation of the two materials into the integrated composite wheel 10. Furthermore, a releasing agent should be applied to the cavity of the mold to facilitate removal of the completed wheel.

The rotation of the mold 17 not only positions and retains the tread material for its subsequent amalgamation with the body material but also can be regulated to consolidate the rigid foam body forming material so as to provide greater density for applications requiring increased strength, or rotational speed may be slowed after the foaming action of the body forming material has commenced if a low density body portion is desired. The speed may even be below the speed necessary to position and mount the tread forming material, since the expanding foam immediately inwardly thereof will support the tread until it has stabilized.

For some requirements it may be desirable to mold the outer bearing race directly into the body portion. For others it may be satisfactory simply to position a core 35 axially of the cavity to form a bore in the body portion into which the bearing may be subsequently inserted. And, for those installations where the body forming material is itself required to form the journal it has been found that chilling of the core 35 prior introduction of the urethane foam body forming material consolidates, or densifies, the rigid foam therearound for increased wear resistance. Further, the core may be coated with a lubricant, such as molybdenum disulphide, which impregnates the journal formed from the body forming material and is thus a self-lubricating journal.

The required speed, or speeds, at which the mold must be rotated to provide such a wheel will generally be dictated by the diamter of the wheel being formed—the speed being an inverse function of the diameter—and the angle at which the mold cavity is inclined. For example, a five inch wheel has been found to be produced most favorably at approximately 1725 r.p.m. with the axis of cavity 18 horizontal. Larger wheels may be formed best at lower speeds: e.g., as low as 900 r.p.m., and smaller wheels may require higher speeds: e.g., as high as 3600 r.p.m.

While the above description relates to a single rotatably mounted mold, it may well be desirable to mount a plurality of such rotatable molds on a carousel base 36 and have the carousel base 36 itself indexed to rotate between a plurality of stations at which the various steps attendant upon making the improved wheel may be performed. As shown in the schematic flow chart depicted in FIG. 6, the carousel carries a plurality of molds 17 and mold rotating devices, the combination of which is indicated generally by the numeral 38 in FIG. 6.

With such an arrangement the mold 17 would be mounted on the mold rotating device at station 40. After the mold is mounted it would begin rotating, as represented by station 41. With the mold rotating and the plug 26 removed from access opening 27, a predetermined quantity of the tread forming urethane elastomer is introduced into the mold cavity 18, as represented by station 42. The mold is further rotated, station 43, to position the elastomer around the raidally outer periphery of the mold cavity 18 and with the tread forming material thus disposed and retained by continued rotation a predetermined quantity of the foam constituents are introduced at station 44. The plug 26 is then seated in access opening 27, station 45, and the mold is continued rotating, through station 46, until the foaming action runs to completion and the elastomer solidifies sufficiently to retain its position.

Thereafter, at station 47, the mold is removed from the chuck 21 and placed on a conveyor 48 where the cure (station 49) is completed by passing the mold through an oven 50. At station 51 the cured wheel 10 is removed from the mold and the empty mold is repositioned on the chuck at station 40 to recycle. In certain installations it may be desirable to remove the tire as soon as wheel forming materials have stabilized sufficiently to retain their shape and then cure the wheel.

It should therefore be readily apparent that the subject invention not only accomplishes the primary purpose of providing an inexpensive, light weight, industrial wheel in which the tread portion is securely affixed to the body portion but also teaches a method and one form of apparatus by which such a wheel can be formed.

What is claimed is:

1. An industrial wheel comprising, a rigid urethane foam body portion having an outer periphery, an annular urethane elastomer tread portion positioned along the outer periphery of said body portion, said body portion being a discoid having axially spaced generally radially oriented side walls smoothly conjoining with said tread portion, the axial portion of said body portion having a greater density than the remainder of said body portion to provide a bearing portion.

References Cited

UNITED STATES PATENTS 3,052,927   9/1962   Hoppe et al. _____ 264—46
3,099,516   7/1963   Hendrickson.

FOREIGN PATENTS 844,139   12/1961   Great Britain.

ARTHUR L. LA POINT, *Primary Examiner.*

C. B. LYON, *Assistant Examiner.*

UNITED STATES PATENT OFFICE
CERTIFICATE OF CORRECTION

Patent No. 3,396,773                          August 13, 1968

Sterling W. Alderfer

It is certified that error appears in the above identified patent and that said Letters Patent are hereby corrected as shown below:

Column 2, line 19, "is" should read -- as --. Column 6, line 54, "844,139" should read -- 884,139 --.

Signed and sealed this 28th day of April 1970.

(SEAL)
Attest:

Edward M. Fletcher, Jr.
Attesting Officer

WILLIAM E. SCHUYLER, JR.
Commissioner of Patents